United States Patent
Clift

(10) Patent No.: US 9,152,806 B2
(45) Date of Patent: Oct. 6, 2015

(54) COMPUTER ECOSYSTEM PROVIDING PRIVACY AND TRACKING IN SHARING USER-GENERATED CONTENT BY ENCRYPTING THE UGC AT THE IMAGING SOURCE

(71) Applicant: SONY CORPORATION, Tokyo (JP)

(72) Inventor: Graham Clift, Poway, CA (US)

(73) Assignee: Sony Corporation, Tokyo (JP)

( * ) Notice: Subject to any disclaimer, the term of this patent is extended or adjusted under 35 U.S.C. 154(b) by 6 days.

(21) Appl. No.: 14/099,441

(22) Filed: Dec. 6, 2013

(65) Prior Publication Data
US 2015/0161402 A1    Jun. 11, 2015

(51) Int. Cl.
*H04L 29/06*    (2006.01)
*G06F 21/60*    (2013.01)

(52) U.S. Cl.
CPC .................................... *G06F 21/606* (2013.01)

(58) Field of Classification Search
CPC .................................................... G06F 21/606
See application file for complete search history.

(56) References Cited

U.S. PATENT DOCUMENTS

| | | | | |
|---|---|---|---|---|
| 5,806,005 A | * | 9/1998 | Hull et al. | 455/566 |
| 5,862,217 A | | 1/1999 | Steinberg et al. | |
| 6,400,824 B1 | * | 6/2002 | Mansoorian et al. | 380/269 |
| 6,750,905 B1 | | 6/2004 | Iwami et al. | |
| 6,968,058 B1 | | 11/2005 | Kondoh et al. | |
| 7,240,208 B1 | | 7/2007 | Oakley | |
| 7,617,246 B2 | | 11/2009 | Koch et al. | |
| 8,032,943 B2 | | 10/2011 | DeMello et al. | |
| 8,166,132 B1 | | 4/2012 | Mooneyham | |
| 8,250,096 B2 | | 8/2012 | Su et al. | |
| 8,321,300 B1 | | 11/2012 | Bockius et al. | |
| 8,468,244 B2 | | 6/2013 | Redlich et al. | |
| 8,516,366 B2 | | 8/2013 | Hicks et al. | |
| 2006/0045287 A1 | * | 3/2006 | Abrams et al. | 381/77 |
| 2008/0267411 A1 | * | 10/2008 | Peterka et al. | 380/279 |
| 2009/0132403 A1 | | 5/2009 | Titus et al. | |
| 2009/0217344 A1 | * | 8/2009 | Bellwood et al. | 726/1 |
| 2009/0249451 A1 | | 10/2009 | Su et al. | |
| 2010/0262916 A1 | | 10/2010 | Jones et al. | |
| 2011/0302308 A1 | | 12/2011 | Prodan et al. | |
| 2013/0185366 A1 | | 7/2013 | Joy | |
| 2014/0093083 A1 | * | 4/2014 | Dadu et al. | 380/275 |

FOREIGN PATENT DOCUMENTS

WO    2013123548    8/2013

OTHER PUBLICATIONS

Graham Clift, "Computer Ecosystem Providing Privacy and Tracking in Sharing User-Generated Content", file history of related U.S. Appl. No. 14/099,086 filed Dec. 6, 2013. (201304933.01-1168.705).

* cited by examiner

*Primary Examiner* — Andrew Nalven
*Assistant Examiner* — Quy Pham
(74) *Attorney, Agent, or Firm* — John L. Rogitz

(57) ABSTRACT

Methods and apparatus are disclosed for securely sharing user-generated content using DRM principles, and for tracking statistics of content viewing. In this way, a user can generate protected content that can still be shared among friends on, e.g., a social network.

13 Claims, 3 Drawing Sheets

COMPUTER ECOSYSTEM PROVIDING PRIVACY AND TRACKING IN SHARING USER-GENERATED CONTENT BY ENCRYPTING THE UGC AT THE IMAGING SOURCE

I. FIELD OF THE INVENTION

The present application relates generally to computer ecosystems and more particularly to providing privacy and tracking in sharing user-generated content.

II. BACKGROUND OF THE INVENTION

A computer ecosystem, or digital ecosystem, is an adaptive and distributed socio-technical system that is characterized by its sustainability, self-organization, and scalability. Inspired by environmental ecosystems, which consist of biotic and abiotic components that interact through nutrient cycles and energy flows, complete computer ecosystems consist of hardware, software, and services that in some cases may be provided by one company, such as Sony. The goal of each computer ecosystem is to provide consumers with everything that may be desired, at least in part services and/or software that may be exchanged via the Internet. Moreover, interconnectedness and sharing among elements of an ecosystem, such as applications within a computing cloud, provides consumers with increased capability to organize and access data and presents itself as the future characteristic of efficient integrative ecosystems.

Two general types of computer ecosystems exist: vertical and horizontal computer ecosystems. In the vertical approach, virtually all aspects of the ecosystem are owned and controlled by one company, and are specifically designed to seamlessly interact with one another. Horizontal ecosystems, one the other hand, integrate aspects such as hardware and software that are created by other entities into one unified ecosystem. The horizontal approach allows for greater variety of input from consumers and manufactures, increasing the capacity for novel innovations and adaptations to changing demands.

Present principles are directed to specific aspects of computer ecosystems, specifically, to permitting users to enjoy and share their user generated content over social networks, using cloud services, using email and by passing physical copies.

SUMMARY OF THE INVENTION

Present principles permit users to control or track the whereabouts of user generated content whether for security, privacy or just for their own tracking interests. In an example, a new service and system can be used in conjunction with digital rights management (DRM) schemes to provide privacy and tracking in sharing user-generated content. Furthermore, as understood herein sensors like cameras and microphones that are used to generate user content typically pass their captured data to a CPU on a motherboard for storing and possibly encrypting, but this means that hackers potentially can track the raw captured data as it passes over busses to be processed.

Accordingly, an imaging device includes at least one imager configured for producing image signals. The imager is disposed on a processing chip. At least one computer readable storage medium bears instructions executable by a processor, and at least one processor is on the processing chip and is configured for accessing the computer readable storage medium to execute the instructions to configure the processor for communicating with a processor of a consumer electronics (CE) device of a user associated with content generated by the imager. The processor when executing the instructions also is configured for accessing a digital rights management (DRM) engine on the chip, encrypting at least some of the image signals according to the DRM engine to render encrypted user-generated content (UGC) prior to transmitting the at least some of the image signals off of the chip, and providing the encrypted UGC to a DRM service according to commands from the CE device.

In some embodiments the encrypted UGC is provided to the DRM service without passing through the CE device. In other embodiments the encrypted UGC is provided to the DRM service by first passing the encrypted UGC through the CE device. The imager can include a charge coupled device (CCD) or a complementary metal-oxide-semiconductor (CMOS). The DRM engine may embody access rules established by the user.

In another aspect, a sound recording device includes at least one transducer configured for transducing sound waves to electronic signals, the electronic signals being output on a processing chip. The device also includes at least one computer readable storage medium bearing instructions executable by a processor and at least one processor on the processing chip and configured for accessing the computer readable storage medium to execute the instructions to configure the processor for communicating with a processor of a consumer electronics (CE) device of a user associated with content generated by the imager. The processor when executing the instructions is also configured for accessing a digital rights management (DRM) engine on the chip, and encrypting at least some of the electronic signals according to the DRM engine to render encrypted user-generated content (UGC) prior to transmitting the at least some of the electronic signals off of the chip. The processor when executing the instructions is also configured for providing the encrypted UGC to a DRM service according to commands from the CE device.

In another aspect, a method includes converting light or sound to electronic signals using a device. The method also includes accessing a digital rights management (DRM) module embodying DRM rules established by a user, and sending the electronic signals to a processor and encrypting the electronic signals to render encrypted user-generated content (UGC) prior to sending the encrypted UGC to a computer bus of a consumer electronics (CE) device. The encrypting is executed according to the DRM module.

The details of the present invention, both as to its structure and operation, can be best understood in reference to the accompanying drawings, in which like reference numerals refer to like parts, and in which:

DETAILED DESCRIPTION OF THE PREFERRED EMBODIMENT

Figure 1:
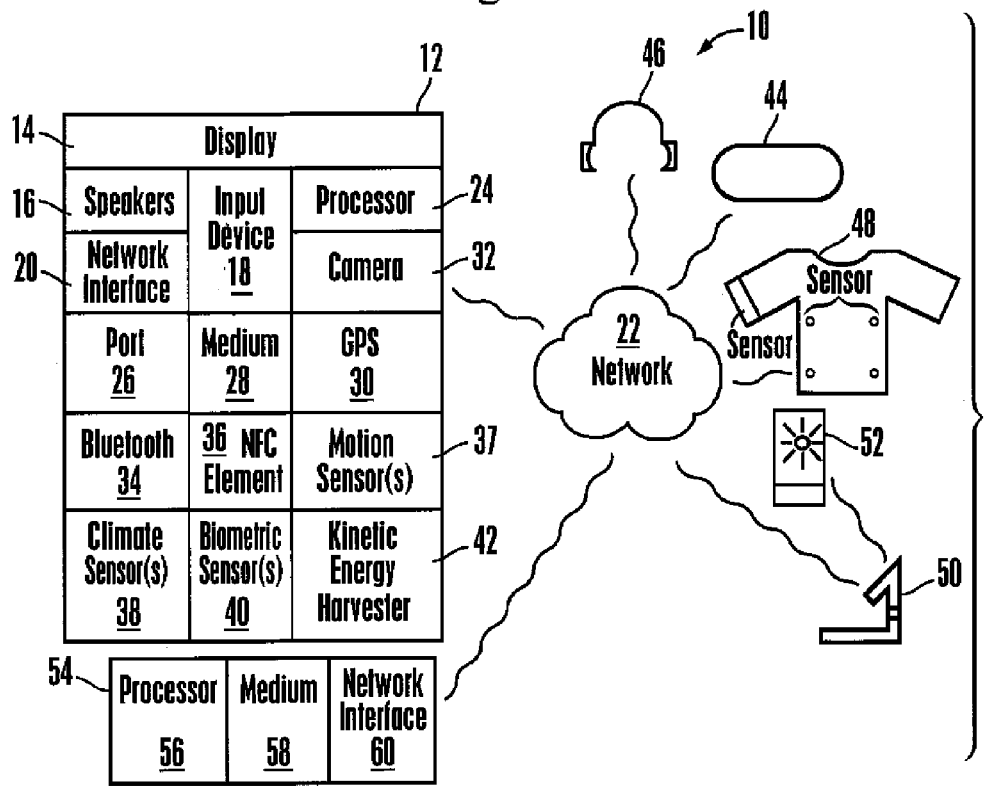
FIG. 1 is a block diagram of an example system including an example in accordance with present principles.

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is an example consumer electronics (CE) device 12 that may be waterproof (e.g., for use while swimming). The CE device 12 may be, e.g., a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc., and even e.g. a computerized Internet-enabled television (TV). Regardless, it is to be understood that the CE device 12 is configured to undertake present principles (e.g. communicate with other CE devices to undertake present principles, execute the logic described herein, and perform any other functions and/or operations described herein).

Accordingly, to undertake such principles the CE device 12 can be established by some or all of the components shown in FIG. 1. For example, the CE device 12 can include one or more touch-enabled displays 14, one or more speakers 16 for outputting audio in accordance with present principles, and at least one additional input device 18 such as e.g. an audio receiver/microphone for e.g. entering audible commands to the CE device 12 to control the CE device 12. The example CE device 12 may also include one or more network interfaces 20 for communication over at least one network 22 such as the Internet, an WAN, an LAN, etc. under control of one or more processors 24. It is to be understood that the processor 24 controls the CE device 12 to undertake present principles, including the other elements of the CE device 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, WiFi transceiver, etc.

In addition to the foregoing, the CE device 12 may also include one or more input ports 26 such as, e.g., a USB port to physically connect (e.g. using a wired connection) to another CE device and/or a headphone port to connect headphones to the CE device 12 for presentation of audio from the CE device 12 to a user through the headphones. The CE device 12 may further include one or more tangible computer readable storage medium 28 such as disk-based or solid state storage, it being understood that the computer readable storage medium 28 may not be a carrier wave. Also in some embodiments, the CE device 12 can include a position or location receiver such as but not limited to a GPS receiver and/or altimeter 30 that is configured to e.g. receive geographic position information from at least one satellite and provide the information to the processor 24 and/or determine an altitude at which the CE device 12 is disposed in conjunction with the processor 24. However, it is to be understood that that another suitable position receiver other than a GPS receiver and/or altimeter may be used in accordance with present principles to e.g. determine the location of the CE device 12 in e.g. all three dimensions.

Continuing the description of the CE device 12, in some embodiments the CE device 12 may include one or more cameras 32 that may be, e.g., a thermal imaging camera, a digital camera such as a webcam, and/or a camera integrated into the CE device 12 and controllable by the processor 24 to gather pictures/images and/or video in accordance with present principles. Also included on the CE device 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the CE device 12 may include one or more motion sensors 37 (e.g., an accelerometer, gyroscope, cyclometer, magnetic sensor, infrared (IR) motion sensors such as passive IR sensors, an optical sensor, a speed and/or cadence sensor, a gesture sensor (e.g. for sensing gesture command), etc.) providing input to the processor 24. The CE device 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that in some embodiments the CE device 12 may also include a kinetic energy harvester 42 to e.g. charge a battery (not shown) powering the CE device 12.

Still referring to FIG. 1, in addition to the CE device 12, the system 10 may include one or more other CE device types such as, but not limited to, a computerized Internet-enabled bracelet 44, computerized Internet-enabled headphones and/or ear buds 46, computerized Internet-enabled clothing 48, a computerized Internet-enabled exercise machine 50 (e.g. a treadmill, exercise bike, elliptical machine, etc.), etc. Also shown is a computerized Internet-enabled entry kiosk 52 permitting authorized entry to a space. It is to be understood that other CE devices included in the system 10 including those described in this paragraph may respectively include some or all of the various components described above in reference to the CE device 12 such but not limited to e.g. the biometric sensors and motion sensors described above, as well as the position receivers, cameras, input devices, and speakers also described above.

Now in reference to the afore-mentioned at least one server 54, it includes at least one processor 56, at least one tangible computer readable storage medium 58 that may not be a carrier wave such as disk-based or solid state storage, and at least one network interface 60 that, under control of the processor 56, allows for communication with the other CE devices of FIG. 1 over the network 22, and indeed may facilitate communication between servers and client devices in accordance with present principles. Note that the network interface 60 may be, e.g., a wired or wireless modem or router, WiFi transceiver, or other appropriate interface such as, e.g., a wireless telephony transceiver.

Accordingly, in some embodiments the server 54 may be an Internet server, may include and perform "cloud" functions such that the CE devices of the system 10 may access a "cloud" environment via the server 54 in example embodiments.

Figure 2:
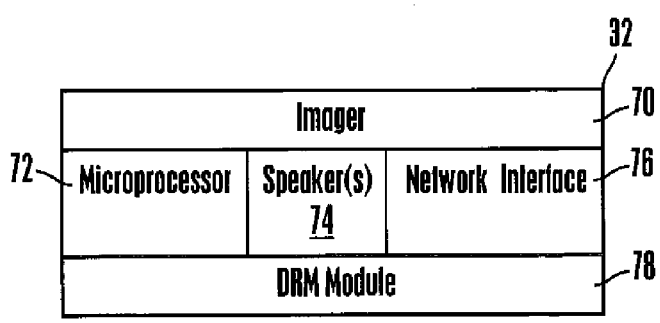
FIG. 2 is a block diagram of an example camera with onboard DRM.

Now referring to FIG. 2, in one example the camera 32 may include an imager assembly 70 such as a charge coupled device (CCD) or a complementary metal-oxide-semiconductor (CMOS). On the same semiconductor chip as the imager assembly 70, a processing circuit 72 accessing computer storage 74 may be arranged to cause images from the imager assembly 70 to be sent through a communication interface 76 such as a wired or wireless universal serial bus (USB) or other interface via an internal computer bus or other communication link to the processor 24 of the example CE device 12 shown in FIG. 1, which is an example of the type of device that may be used in connection with logic below. Alternatively or in addition, the processing circuit 72 may send, via a typically wireless interface 76 that may be, e.g., a WiFi interface or wireless telephony interface, image signals from the imager assembly 70 to a cloud server such as the server 54 shown in FIG. 1. The processing circuit 72 may execute a DRM module 78 to, among other things, encrypt image signals from the imager assembly 70 prior to sending the image signals to the CE device processor 24 and/or server 54.

Thus, in the example of FIG. 2 the DRM engine is built into the silicon of a CCD or CMOS video sensor chip. In this way, the ability of hackers to access user-generated content is frustrated by embedding the DRM engine inside the sensor unit that may work autonomously with a cloud service (hosted, e.g., by the server 54) to securely manage the content by encrypting the content before ever allowing the content to flow over a CPU bus. When combined with principles below, the user of the camera 32 can manage the content from source to sink thus virtually eliminating hacking attempts without compromising flexibility of sharing.

Figure 3:
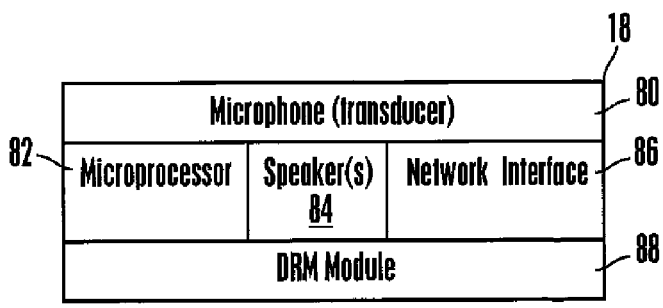
FIG. 3 is a block diagram of an example microphone with onboard DRM.

Now referring to FIG. 3, in one example the microphone 18 shown in FIG. 1 as an input device may include a transducer assembly 80 such as a piezoelectric assembly that converts incoming sound waves to electricity. On the same semiconductor chip r in the microphone body as the assembly 80, a processing circuit 82 accessing computer storage 84 may be arranged to cause signals from the assembly 80 to be sent through a communication interface 86 such as a wired or wireless universal serial bus (USB) or other interface via an internal computer bus or other communication link to the processor 24 of the example CE device 12 shown in FIG. 1, which is an example of the type of device that may be used in connection with logic below. Alternatively or in addition, the processing circuit 82 may send, via a typically wireless interface 86 that may be, e.g., a WiFi interface or wireless telephony interface, signals from the assembly 80 to a cloud server such as the server 54 shown in FIG. 1. The processing circuit 82 may execute a DRM module 88 to, among other things, encrypt signals from the assembly 80 prior to sending the image signals to the CE device processor 24 and/or server 54.

Thus, in the example of FIG. 3 the DRM engine is built into the microphone 18 preferably on the same chip as the transducer assembly 80. In this way, the ability of hackers to access user-generated content is frustrated by embedding the DRM engine inside the sensor unit that may work autonomously with a cloud service (hosted, e.g., by the server 54) to securely manage the content by encrypting the content before ever allowing the content to flow over a CPU bus. When combined with principles below, the user of the microphone 18 can manage the content from source to sink thus virtually eliminating hacking attempts without compromising flexibility of sharing.

Figure 4:
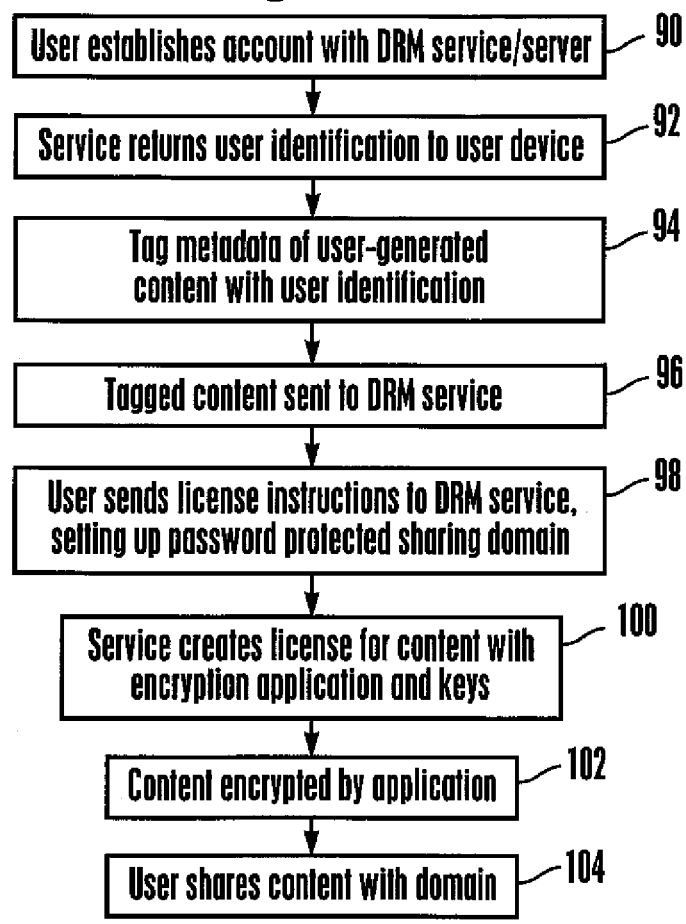
FIGS. 4 and 5 are flowcharts of example logic according to present principles.

Turning now to FIG. 4, at block 90 a user employing, e.g., the CE device 12, creates an account with a cloud digital rights management (DRM) service such as one hosted by, e.g., the server 54. This account may be created by accessing a web page over the Internet and establishing a user name and password, as well as providing an email address. Typically, a confirmation is sent from the server to the email address which can be clicked on by the user to confirm the account settings. The service can then return a unique user ID to the user through the CE device 12 at block 92.

Proceeding to block 94, metadata of user-generated content such as photos/videos and the like from, e.g., the camera 32 and/or audio content from the microphone 18 is tagged with the user ID received at block 92. The user ID may simply be appended by the processor 24 to a metadata field in each audio video file generated by the user as indicated by source information contained in the metadata, or it may be inserted into an "owner" field of the metadata. The tagged content can be sent from the user's CE device 12 to the DRM service hosted by the server 54 at block 96 along with, at block 98, user license instructions, discussed in further detail below, and if desired an identification of what type of operating system the user's CE device 12 employs. The information also may include instructions from the user setting up a sharing domain entry to which may be protected by a password established by the user. Example methods for doing this also are discussed further below.

In response to receiving the user's license instructions at block 90, at block 100 the DRM service creates a license for that content in consonance with the user's instructions. For example, if the user indicated that content should be available for a limited period of time, the license so indicates, and the service checks the content and when the period is elapsed removes the content from the sharing domain so that it no longer may be accessed.

The service also creates an encryption application or application stub, targeted for the user's operating system based on the operating system information received at block 98, along with the keys required to encrypt the content securely contained therein. At block 102 the content is encrypted by the application at the server or by an existing local (to the CE device 12) application plus application stub as may be the case when the camera 32, for example, employs a local DRM module 78 as shown in FIG. 2 to locally encrypt content prior to placing the content on an internal CPU bus. It is to be understood in these circumstances that the CE device processor 24 may receive the application/stub and keys and pass them to the camera processor 72, or that the service may send the application/stub and keys directly to the camera processor 72 through the network interface 76 for greater security, with the user providing, e.g., at block 98 the network ID of the camera to the server for this purpose.

Block 104 indicates that user-designated friends may access the sharing domain by, e.g., entering a network address of the domain provided to them by the user (as provided to the user by the DRM service) and if password protected, entering the password, typically as also provided to them by the user. They may then browse a content listing to view/listen to content generated by the user as discussed further below.

Figure 5:
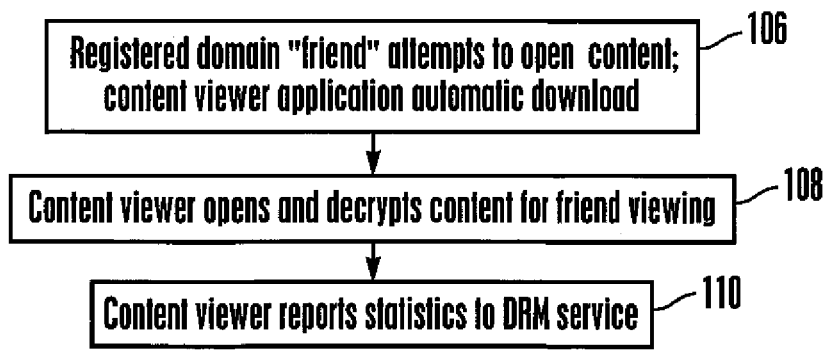

Indeed, now referring to FIG. 5, at block 106, when registered users (friends) on the domain associated with the content metadata attempt to open the content, the contact with the service typically reveals the type of operating system the contacting friend has. The service typically downloads to the friend device a content viewer application, or application module, with embedded keys that runs securely within, e.g., an HTML5 browser, an Android platform, an iOS platform, a Windows platform or other platform, tailored as appropriate for the type of operating system employed by the friend device. The keys are used at block 108 to decrypt the selected content for viewing/listening.

At block 110, the content viewer application of the friend device may communicate with the DRM service through a network interface of the friend device to report viewing statistics that can be used by the content owner to determine number of views and even the friend viewer's own UserIDs. That is, as the friend opens each user-generated piece of content in the sharing domain, this is reported to the DRM service (or simply noted by the DRM service when it downloads the content), so that the user owning the sharing domain may view who viewed what content. The length of time the content was viewed may also be reported to the DRM service.

If desired, the content viewer application downloaded to friend devices may have techniques embedded to prevent screen scrapers from capturing pixels. This may involve only presenting some of the pixels during any frame such that the entire picture is only visible from the construction of the set of sequential frames. The content viewer application may be only a module that plugs into the local application and provides the decryption capability to the viewer. The content viewer may also distribute the decryption processing between the cloud service and the local application such that hackers may not have offline access to the complete application, preventing many brute force hacking attempts to working. The content owner may at any time change the domain and license instructions in order to change viewing rights dynamically.

Figure 6:
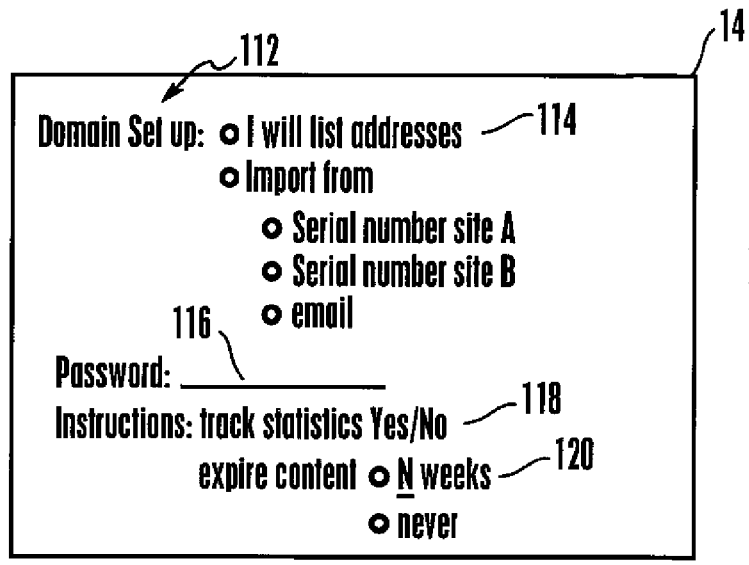
FIG. 6 is an example user interface (UI) that a user can employ to establish a sharing domain and DRM license rules for user-generated content meant to be shared within the domain.

FIG. 6 shows an example user interface (UI) 112 that can be sent from the DRM service to the CE device 12 of the user seeking to establish a sharing domain. The user may be given selections 114 in entering the identities/addresses of friends the user wishes to access the content in the domain. These options may include user input of names and addresses on a friend-by-friend basis, and/or options to import friend names from social networking sites, email address books, and the like. In these instances selection to import names may cause the CE device processor automatically to access local or web-based storage using the user's requisite account credentials to obtain the names.

Also, the user may establish a password for the domain by entering the password into a field 116, with the password subsequently being necessary for friends to enter to view content in the domain.

The owning user may also establish one or more license conditions as alluded to above. For example, using selector options 118 the user may decide to track, or not, statistics related to who viewed what content in the domain. By means of the selector 120 the user may also establish an expiration period so that each piece of content will expire, i.e., be removed from the domain, by the DRM service when the expiration period is elapsed from, e.g., the time the content was posted to the domain. Other license conditions may be established, e.g., whether viewing friends are to be permitted to rate content they viewed, whether some viewing friend statistics are to be reported and others not, etc. the case of automatically encrypted content from the camera or microphone shown in FIGS. 2 and 3, respectively, posting is accomplished automatically by the camera or microphone processor uploading the content through the local network interface to the CE device 12 and/or the DRM service. Other license conditions can include indicating whether content accessed in the domain by friends can be copied by the friends. Restrictions on copying can be established programmatically by means known in the art if desired.

Figure 7:
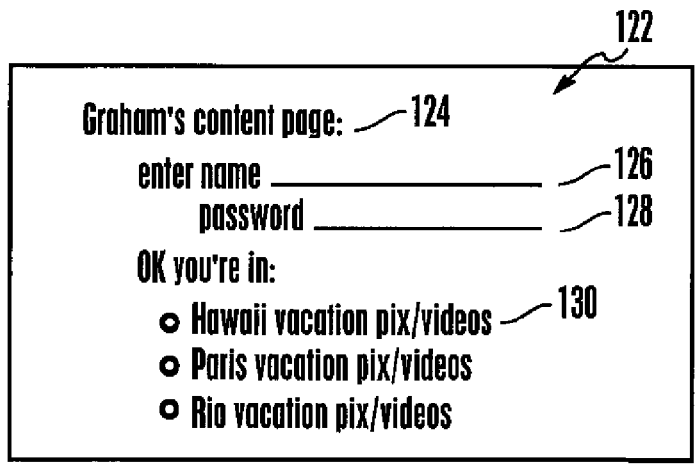
FIG. 7 is an example user interface that a friend can use to access user-generated content in the sharing domain.

FIG. 7 shows a UI 122 that may be downloaded from the DRM service and presented on the display of a CE device owned by a friend of the user owning the domain discussed above to access user-generated content on the domain. The UI 122 may indicate at 124 the name of the owning user. The UI 122 may also have user name and password entry fields 126, 128 as shown, respectively, into which, to gain access, the friend must respectively enter a user name that matches one of the user names entered by the owing user by means of, e.g., the UI 112 shown in FIG. 6 along with the password established by the owning user by means of, e.g., the UI 112 shown in FIG. 6. Once the DRM service authenticates the user name and password, it may present a message to that effect and a list 130 of content and/or content albums that can be accessed to view the content in the domain.

Figure 8:
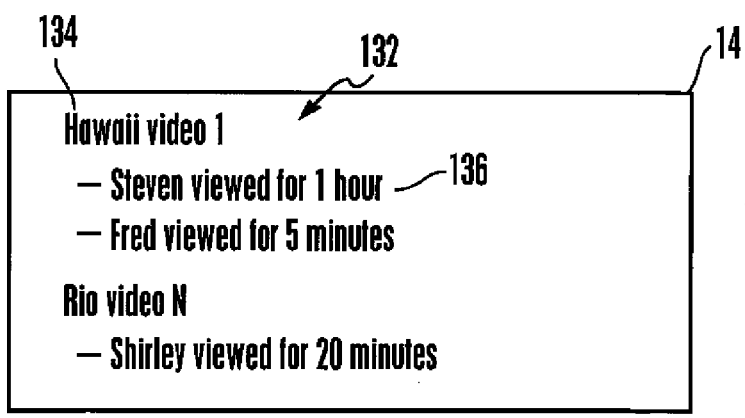
FIG. 8 is a UI that can be presented on the owing user's device to review viewing statistics.

FIG. 8 shows a UI 132 that can be presented by the DRM service on the CE device 12 of the user owning the sharing domain to view statistics related to content 134 that was viewed, and who viewed the content and for how long 136.

While the particular COMPUTER ECOSYSTEM PROVIDING PRIVACY AND TRACKING IN SHARING USER-GENERATED CONTENT BY ENCRYPTING THE UGC AT THE IMAGING SOURCE is herein shown and described in detail, it is to be understood that the subject matter which is encompassed by the present invention is limited only by the claims.

What is claimed is:

1. An imaging device comprising:
   at least one imager of a camera, the imager configured for producing image signals, the imager being disposed on a processing chip;
   at least one computer memory comprising instructions executable by a processor; and
   at least one processor on the processing chip and configured for accessing the computer memory to execute the instructions for:
   communicating with a processor of a consumer electronics (CE) device of a user associated with content generated by the imager, the CE device having sent to a remote digital rights management (DRM) service a network identification of the camera;
   receiving from the remote DRM service encryption information addressed to the network identification, the encryption information not being sent to the processor of the CE device, wherein the encryption information includes at least one encryption application for execution thereof by the processor on the processing chip;
   accessing a digital rights management (DRM) engine on the processing chip;
   using the encryption information, encrypting at least some of the image signals according to the DRM engine to render encrypted user-generated content (UGC) prior to transmitting the at least some of the image signals off of the processing chip; and
   providing the encrypted UGC to the remote DRM service according to commands from the CE device.

2. The device of claim 1, wherein the instructions are executable for providing the encrypted UGC to the remote DRM service without passing the encrypted UGC through the CE device.

3. The device of claim 1, wherein the instructions are executable for providing the encrypted UGC to the remote DRM service by first passing the encrypted UGC through the CE device.

4. The device of claim 1, wherein the imager includes a charge coupled device (CCD).

5. The device of claim 1, wherein the imager includes a complementary metal-oxide-semiconductor (CMOS).

6. The device of claim 1, wherein the DRM engine embodies access rules established by the user.

7. A sound recording device comprising:
   at least one transducer configured for transducing sound waves to electronic signals, the electronic signals being output on a processing chip on which the transducer is located;
   at least one computer memory comprising instructions executable by a processor; and
   at least one processor on the processing chip and configured for accessing the memory for:
   communicating with a processor of a consumer electronics (CE) device of a user associated with content generated by the transducer, the CE device having sent to a remote digital rights management (DRM) service a network identification associated with the sound recording device;
   receiving from the remote DRM service encryption information addressed to the network ID, the encryption information not being sent to the processor of the CE device;
   accessing a digital rights management (DRM) engine on the processing chip;
   using the encryption information, encrypting at least some of the electronic signals according to the DRM engine to render encrypted user-generated content (UGC) prior to transmitting the at least some of the electronic signals off of the processing chip;
   making the encrypted UGC available to social network friends of the user of the CE device; and
   generating an indication of friends who accessed the UGC and how long the UGC was presented on at least one device of a friend.

8. The device of claim 7, wherein the encrypted UGC is provided to the remote DRM service without passing through the CE device.

9. The device of claim 7, wherein the encrypted UGC is provided to the remote DRM service by first passing the encrypted UGC through the CE device.

10. The device of claim 7, wherein the DRM engine embodies access rules established by the user.

11. A device comprising:
    at least one computer memory that is not a transitory signal and comprising instructions executable by at least one processor to:
    communicate with a processor of a consumer electronics (CE) device associated with content generated by at least one sensor disposed on a processing chip, the at least one sensor being configured to convert light to electronic signals or sound to electronic signals;
    receive from a remote digital right management (DRM) service encryption information addressed to a network identification, the encryption information not being sent to the processor of the CE device;
    access a DRM engine on the processing chip;

using the encryption information, encrypt at least some of the content according to the DRM engine to render encrypted user-generated content (UGC) prior to transmitting the at least some of the content off of the processing chip; and making the encrypted UGC available to social network friends of a user of the CE device such that an indication of friends who accessed the UGC and how long the UGC was presented on at least one device of a friend can be generated.

12. The device of claim 11, wherein the instructions are executable to provide the encrypted UGC to the remote DRM service without passing the encrypted UGC through the CE device.

13. The device of claim 11, wherein the instructions are executable to provide the encrypted UGC to the remote DRM service by first passing the encrypted UGC through the CE device.

* * * * *